(12) United States Patent
Ferreira et al.

(10) Patent No.: US 7,197,408 B2
(45) Date of Patent: Mar. 27, 2007

(54) FLOWMETER SPECIFICATION AND ORDERING SYSTEM

(75) Inventors: David A. Ferreira, Hope, RI (US); Wade M. Mattar, Wrentham, MA (US)

(73) Assignee: Invensys Systems, Inc., Foxboro, MA (US)

(*) Notice: Subject to any disclaimer, the term of this patent is extended or adjusted under 35 U.S.C. 154(b) by 76 days.

(21) Appl. No.: 11/043,563

(22) Filed: Jan. 26, 2005

(65) Prior Publication Data

US 2005/0171708 A1 Aug. 4, 2005

Related U.S. Application Data

(60) Provisional application No. 60/540,233, filed on Jan. 29, 2003.

(51) Int. Cl.
G06F 19/00 (2006.01)
(52) U.S. Cl. .............. 702/45; 73/242; 700/27; 705/26
(58) Field of Classification Search ............ 702/45, 702/50, 100, 188; 700/27, 99, 301; 705/26, 705/27; 713/1; 73/242, 861; 356/28
See application file for complete search history.

(56) References Cited

U.S. PATENT DOCUMENTS

| | | | | |
|---|---|---|---|---|
| 4,043,198 | A * | 8/1977 | Stillwell et al. ............ | 73/242 |
| 4,571,801 | A * | 2/1986 | Ewing ................. | 29/890.09 |
| 5,701,172 | A * | 12/1997 | Azzazy .................... | 356/28 |
| 5,774,372 | A * | 6/1998 | Berwanger ............... | 702/45 |
| 6,282,518 | B1 * | 8/2001 | Farrell et al. .............. | 705/26 |
| 6,427,127 | B1 * | 7/2002 | Cunningham ............. | 702/45 |
| 6,606,570 | B2 * | 8/2003 | Bugarin et al. ............ | 702/45 |
| 6,662,062 | B1 | 12/2003 | Bjornson et al. | |
| 6,768,950 | B2 * | 7/2004 | Bugarin et al. ............ | 702/45 |
| 6,785,805 | B1 | 8/2004 | House et al. | |
| 2001/0042030 | A1 | 11/2001 | Ito et al. | |
| 2002/0065614 | A1 * | 5/2002 | Bugarin et al. ............ | 702/45 |
| 2002/0103702 | A1 | 8/2002 | Ifflander et al. | |
| 2002/0133307 | A1 * | 9/2002 | Maginnis ................ | 702/100 |
| 2002/0156694 | A1 * | 10/2002 | Christensen et al. ........ | 705/26 |
| 2002/0156698 | A1 | 10/2002 | Machau et al. | |

(Continued)

OTHER PUBLICATIONS

FlowExpert II Project, Functional Specification, Dated Aug. 21, 1998.

*Primary Examiner*—John E. Barlow, Jr.
*Assistant Examiner*—John Le
(74) *Attorney, Agent, or Firm*—Sampson & Associates, P.C.

(57) ABSTRACT

A modular system and method is provided for enabling remote configuring and ordering of flowmeters in a client-server environment. The system includes a meter selection module configured to enable a user to select from a plurality of flowmeter types. A process data module receives process data from a client and a fluid selection module coupled to the process module is configured to receive a process fluid selection and to calculate properties thereof. A sizing module generates parameters of at least one sized flowmeter, sized in accordance with the received process data. A material selection module provides a list of materials from which the sized flowmeter may be fabricated, and a fluid rating module rates compatibility of the various materials with the process fluid selection. A results module is configured to generate data corresponding to expected performance of the sized flowmeter.

40 Claims, 22 Drawing Sheets

U.S. PATENT DOCUMENTS

| | | |
|---|---|---|
| 2002/0161459 A1* | 10/2002 | Bugarin et al. ............... 700/27 |
| 2002/0188526 A1 | 12/2002 | Muneishi et al. |
| 2003/0135429 A1 | 7/2003 | Pous et al. |
| 2003/0139972 A1 | 7/2003 | Parulski et al. |
| 2004/0002821 A1* | 1/2004 | Kanke et al. ................. 702/45 |
| 2004/0098316 A1 | 5/2004 | Philippe et al. |
| 2004/0143511 A1 | 7/2004 | Miller et al. |
| 2005/0145039 A1* | 7/2005 | Tsai ............................ 73/861 |

\* cited by examiner

Welcome to FlowExpertPro.com!
Please select a meter type to size.
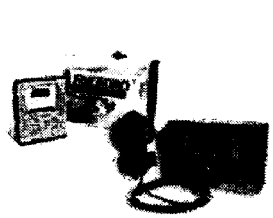 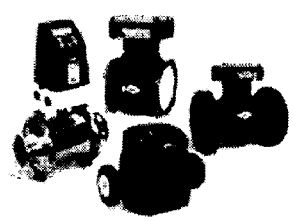 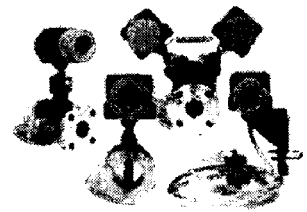
Coriolis  Magnetic  Vortex
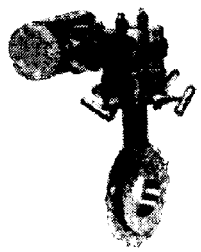 
Compact Orifice  IFOA
150
Figure 3

Vortex Meter - Customer/Representative

| Customer/Representative | Process Data | Extended Process Data | Sizing |

Customer

Customer Name
Contact Name
Address

Phone Number
Fax Number
E-Mail Address

152

Representative

Company
Sales Person
Sales Order Number
Phone Number
Fax Number
Cellular Number
E-Mail Address

Figure 4

Vortex Meter - Process Data

| Customer/Representative | Process Data | Extended Process Data | Sizing |

Fluid Type [ ▼ ]    Tag Number [          ]
Fluid      [        ] [Select]    Tag Name [          ]
Fluid Name [Only shown if "Other" is the fluid]   ⌐180

|  | Minimum Startup | Normal | Maximum | Units |
|---|---|---|---|---|
| Flow Rate | [ ] | [ ] | [ ] | [         Units] |
| Temperature | [ ] | [ ] | [ ] | [     ▼] 210 |
| Pressure | [ ] | [ ] | [ ] | [     ▼] |
| Density/SG |  | [ ] |  | [     ▼] |
| Viscosity |  | [ ] |  | [     ▼] |
| Base Density |  | [ ] |  | units |

Vortex Meter - Extended Process Data

| Customer/Representative | Process Data | Extended Process Data | Sizing |

Meter Body Time [ ▼]
Sensor Fill Fluid and Material [ ▼]
Line Size [ ] [ ▼]
Mating Pipe Material [ ▼]
Sensor Type [Read Only Result]

Electrical

Dual Electronics and Isolation Valve [ ▼]
Output [ ▼]
Scaling [Optionally Displayed] pulse/ [ ]
URL 5000 Hz [Optionally Displayed] [ ]
20 mA (URV) [Optionally Displayed] [ ]
4 mA (LRV) [Optionally Displayed] units

Coriolis Meter - Extended Process Data

| Customer/Representative | Process Data | Extended Process Data | Sizing |

Meter End Connection Type [ ▼ ]
Line Size [ ] [ ▼ ]
Mating Pipe Material [ ▼ ]

Electrical

Flowtube Electrical Safety Certification [ ▼ ]
Communications Protocol [ ▼ ]
Number of Outputs [ ▼ ]
4 - 20 mA [ ▼ ]
Pulse [ ▼ ]
Output [ ▼ ]
Scaling [Optionally Displayed] pulse/ [ ]
URL 10000 Hz [Optionally Displayed] [ ]
20 mA (URV) [Optionally Displayed] [ ]
4 mA (LRV) [Optionally Displayed] units

IFOA Meter - Extended Process Data

| Customer/Representative | Process Data | Extended Process Data | Sizing |

Line Size
Mating Pipe Material
Orifice Plate Material
Orifice Plate Bore

Magnetic Meter - Transmitter Information 162

| Transmitter | Output | Configuration/ Communications Protocol | Flowtube Supported | Available Mounting | Notes |
|---|---|---|---|---|---|
| IMT 25 | 4 - 20 mA<br>Frequency Output<br>Scaled Pulse | FoxCom<br>Hart<br>Local Display | 2800<br>8000A<br>8300<br>9100A<br>9200A<br>9300A | remote<br>integral or remote<br>remote<br>remote<br>remote<br>integral or remote | General fluids, ordinary applications, pulp consistency up to 5 - 6%, high accuracy |
| IMT 25L | 4 - 20 mA | FoxCom | 2800<br>8000A<br>8300<br>9100A<br>9200A<br>9300A | integral or remote<br>remote<br>integral or remote<br>remote<br>remote<br>remote | General fluids, ordinary applications, pulp consistency up to 5 - 6%, No itegral indicator (low cost), high accuracy |
| IMT 96 | 4 - 20 mA<br>Frequency Output<br>Scaled Pulse | FoxCom<br>Local Display | 2800 | remote | Can accommodate difficult applications such as high consistency pulp stock, pulsating flow, entrained gas, dense slurries, and chemical additives. |
| Model 47 | 0 - 20 mA<br>4 - 20 mA<br>Frequency Output<br>Scaled Pulse | HART | 4700S | integral or remote | Sanitary design, automatically reads flowtube data PROM for quick start-up, 0.5% of rate accuracy |
| Model 48 | 0 - 20 mA<br>4 - 20 mA<br>Frequency Output<br>Scaled Pulse | HART | 4700S | integral or remote | Sanitary design, automatically reads flowtube data PROM for quick start-up, 0.25% of rate accuracy, Plug-in module for protocol |

Close

Figure 9B

Vortex Meter - Sizing

| Customer/Representative | Process Data | Extended Process Data | Sizing |

Results|PSS|Send Model Code to iastore.com

170 — Select Meter Size [ 218 ▼ ] 224 inches or mm 176

| | | |
|---:|:---:|:---|
| Maximum Meter Capacity (URL) | Read Only Result | flow units |
| Minimum Meter Capacity (LFCI) | Read Only Result | flow units |
| Flow Range | Read Only Result | ratio |
| Pressure Drop at Maximum Process Flow Rate | Read Only Result | pressure units |
| Pressure Drop at Minimum Startup Process Flow Rate | Read Only Result | pressure units |
| Accuracy at Maximum Process Flow Rate | Read Only Result | % % |
| Accuracy at Minimum Startup Process Flow Rate | Read Only Result | ft/s or m/s |
| Velocity at Maximum Process Flow Rate | Read Only Result | ft/s or m/s |
| Velocity at Minimum Process Flow Rate | Read Only Result | pulse/flow unit |
| Nominal Flowing K Factor | Read Only Result | Hz |
| Frequency at Maximum Pressure Flow Rate | Read Only Result | |
| Reynolds Number at Minimum Startup Flow Rate | Read Only Result | |
| Wetted Material | [ ▼ ] | —174 |
| Flange | [ ▼ ] | |
| Model Code | Read Only Result | —172 |

164

① indicates the value is Conditionally Acceptable.
● indicates the value is Out of Range.

Figure 10

Coriolis Meter - Sizing

| Customer/Representative | Process Data | Extended Process Data | Sizing |

Results|PSS|Send Model Code to iastore.com

170 — Select Meter Size [ 218 ▼ ] 224 — inches or mm    176

| | | |
|---:|:---:|:---|
| Maximum Meter Capacity (URL) | Read Only Result | flow units |
| Minimum Meter Capacity (LFCI) | Read Only Result | flow units |
| Extended Meter Capacity | Read Only Result | flow units |
| Flow Range | Read Only Result | ratio |
| Pressure Drop at Maximum Process Flow Rate | Read Only Result | pressure units |
| Pressure Drop at Minimum Startup Process Flow Rate | Read Only Result | pressure units |
| Accuracy at Maximum Process Flow Rate | Read Only Result | %% |
| Accuracy at Minimum Startup Process Flow Rate | Read Only Result | ft/s or m/s |
| Velocity at Maximum Process Flow Rate | Read Only Result | ft/s or m/s |
| Velocity at Minimum Process Flow Rate | Read Only Result | |
| Reynolds Number at Minimum Startup Flow Rate | Read Only Result | |
| Wetted Material | [ ▼ ] | —174 |
| Flange | [ ▼ ] | |
| Model Code | Read Only Result | —172 |

① indicates the value is Conditionally Acceptable.
● indicates the value is Out of Range.

IFOA Meter - Sizing

| Customer/Representative | Process Data | Extended Process Data | Sizing |

Results|PSS|Send Model Code to iastore.com

170 — Select Meter Size [ 218 ▼ ] 224 inches or mm 176

| | | |
|---|---|---|
| Pipe Diameter | Read Only Result | inches or mm |
| Reynolds Number at Maximum Process Flow Rate | Read Only Result | |
| Reynolds Number at Normal Process Flow Rate | Read Only Result | |
| Differential Pressure at Maximum Process Flow Rate | Read Only Result | in H20 (60°F) |
| Differential Pressure At Normal Process Flow Rate | Read Only Result | in H20 (60°F) |
| Discharge Coefficient C | Read Only Result | |
| Thermal Correction Factor | Read Only Result | |
| Beta | Read Only Result | |
| Uncovered Head Loss | Read Only Result | pressure units |
| Body Material | [ ▼ ] | —174 |
| Flange | [ ▼ ] | |
| Model Code | Read Only Result | —172 |

Fluid Selection

| | |
|---|---|
| Acetone / Alumia / • / • / • (list 182) | Physical Properties for Fluid_Name 190 |
| | Fluid Type [Read Only Result] |
| | Temperature [ ] [▼] |
| | Pressure [ ] [▼] |
| | Density/GS [Read Only Result] [▼] |
| | Viscosity [Read Only Result] [▼] |
| | Molecular Weight [Read Only Result] |
| | Compressibility [Read Only Result] |
| [Other Fluid] ☑ Show All Fluids | Ideal Specific Gravity [Read Only Result] |
| Select "Other Fluid" for a fluid that is not in the database. This requires that temperature, pressure, density and viscosity be manually entered. Flowing Density is used as Base Density. | Base Temperature [ ] units |
| | Base Pressure [ ] units |
| | Base Density [Read Only Result] units |
| | [Update] |

[Back to Process Data With Selected Fluid and Values] 184   [Back to Process Data] 186   [Materials Selection Guide] 188

Materials Selection Guide for FLUID_NAME

| Coriolis | Magnetic | Vortex |

| Body, Process Flange | | Sensor, Diaphragm | | Gaskets, Coatings | | 192 |
|---|---|---|---|---|---|---|
| 200 A | 316 ss | 200 A | 316 ss | B | Buna-N | |
| B | Carbon Steel | A | Gold Plated 316 ss  200 | A | Kel-F | |
| A | Hastelloy C | A | Hastelloy C | X | Neoprene | |
| X | Kynar | A | Monel | A | Ryton | |
| A | Monel | A | Nl/Permanickel | X | Silicone | |
| | | A | Tantalum | A | Teflon | |
| | | | | C | Viton | |

| Close | Rating Details |
— 202

Figure 14

Materials Selection Guide for FLUID_NAME

[Coriolis] [Magnetic] [Vortex]

200  Meter Assembly
- E 380/1193   316 ss
- E 120/49     Hastelloy C               194
- E            Titanium
- E 212/100    Zirconium

[Close] [Rating Details] — 202

Figure 15

Materials Selection Guide for FLUID_NAME

[Coriolis] [Magnetic] [Vortex]

| | Flowtube Lining | | Electrode Material |
|---|---|---|---|
| N/A | Ceramic | N/A | 316 ss |
| N/A | Neoprene | N/A | Hastelloy C |
| N/A | Polyurethane | N/A | Platinum |
| N/A | ptfe/pfa | N/A | Tantalum |
|  |  | N/A | Titanium |

196

[Close] [Rating Details] — 202

Figure 16

Ratings Explanation for Coriolis Meters 204

E  Excellent, corrosion rate less than 0.02 mm (0.0001") per year.

G  Good, corrosion rate less than 0.1 mm (0.005") per year.

U  Unsuitable

*  Possible Use. Please contact Foxboro for more information.

N/A  Data not generally available.

When a temperature is given, (E212/100), this means the rating applies up to 212 degrees Fahrenheit or 100 degrees Celsius. If no temperature is given, assume the boiling point of the fluid or the maximum temperature of the meter, whichever is lower.

For Salts (Sodium Chloride, Potassium Sulphate, etc.), 100% concentration is implied.

Higher concentrations and temperatures are permissible for short periods (i.e. during cleaning cycles).

[ Close ]

Figure 17

Ratings Explanation for Magnetic and Vortex Meters          206

| | |
|---|---|
| A | Generally considered best choices. |
| B | Frequently used. Consider if "A" rated option is not available. |
| C | Occasionally used. Use with caution. |
| X | Not recommended; generally concidered unsuitable. |
| V | Corrosion varies greatly with concentration and temperature. |
| N/A | Data not generally available. |

| | |
|---|---|
| 1 | May cause stress cracking. |
| 2 | May pit. |
| 3 | Combination is explosive. |
| 4 | Temperature is important. |
| 5 | May be subject to local safety regulations. |
| 6 | These specifications apply to forged and rolled Hastelloy C. Do not use for IFOA or Vortex meter bodies. |

Close

Figure 18

Flow Units Selection

Volume Units

| | |
|---|---|
| ⊙ bbl (liq) | liquid barrel (31.5 US Gallons) |
| ⊙ bbl (oil) | oil barrel (42 US Gallons) |
| ⊙ ft³ | actual cubic feet |
| ⊙ impgal | imperial gallons |
| ⊙ l | liters |
| ⊙ ml | milliliters |
| ⊙ m³ | cubic meters |
| ⊙ MUSgal | million gallons |
| ⊙ Ml | million liters |
| ⊙ USgal | US gallons |

Standard Volume Units

| | |
|---|---|
| ⊙ Nl | normal liters |
| ⊙ Nm³ | normal cubic meters |
| ⊙ Sbbl (liq) | standard barrels (liquid) |
| ⊙ Sbbl (oil) | standard barrels (oil) |
| ⊙ Sft³ | standard cubic feet |
| ⊙ Sm³ | standard cubic meters |

Velocity Units

| | |
|---|---|
| ⊙ ft | feet |
| ⊙ m | meters |

Mass Units

| | |
|---|---|
| ⊙ g | grams |
| ⊙ kg | kilograms |
| ⊙ lb | pounds mass |
| ⊙ lt | long tons |
| ⊙ mt | metric tons |
| ⊙ st | short tons |

Time Units

| | |
|---|---|
| ⊙ s | second |
| ⊙ min | minute |
| ⊙ hr | hour |
| ⊙ day | day |

[ Back to Process Data With Selected Units ]   [ Back to Process Data ]

Invensys Foxboro
FlowExpertPro.com Results

| Customer/Representative | |
|---|---|
| Customer | Representative |
| Customer Name: | Company: |
| Contact Name: | Sales Person: |
| Address: | Sales Order Number: |
| | Date: 1/24/2005 |
| | Phone Number: |
| Phone Number: | Fax Number: |
| Fax Number: | Cellular Number: |
| E-Mail Address: | E-Mail Address: |

| Process Data | |
|---|---|
| Meter Type: | Vortex |
| Fluid Type: | Liquid |
| Fluid: | Water |
| Tag Number: | |
| Tag Name: | |

| | Minimum Startup | Normal | Maximum | |
|---|---|---|---|---|
| Flow Rate: | 15.00 | 20.00 | 22.00 | ft³/s |
| Temperature: | 65.0 | 70.0 | 75.0 | °F |
| Pressure: | 0.00 | 0.00 | 15.00 | psig |
| Density/GS: | | 62.30454 | | lb/ft³ |
| Viscosity: | | 0.996 | | centipoise |

| Extended Process Data | |
|---|---|
| Meter BodyType: | Flanged |
| Sensor Fill Fluid and Material: | Silicone Fill, Stainless Steel |
| Line Size: | 0.00 inches |
| Mating Pipe Material: | Stainless Steel |
| Sensor Type: | Standard Range |

| Electrical | |
|---|---|
| Dual Electronics and Isolation Valve: | (S) Single, No Isolation Valve |
| Output: | Analog |
| 20 mA (URV): | 0.00 |
| 4 mA (LRV): | 0.00 |

| Sizing | |
|---|---|
| Model: | Model 83 |
| Meter: | 12.0000 inches |
| Maximum Meter Capacity (URL): | 19.080 ft³/s |
| Minimum Meter Capacity (LFCI): | 0.340 ft³/s |
| Extended Capacity: | 23.850 ft³/s |
| Pressure Drop at Maximum Process Flow Rate: | 10.60 psi |
| Pressure Drop at Minimum Process Flow Rate: | 4.93 psi |
| Accuracy at Maximum Process Flow Rate: | 0.50 % |
| Accuracy at Minimum Process Flow Rate: | 0.50 % |
| Velocity at Maximum Process Flow Rate: | 29.2 ft/s |
| Velocity at Minimum Process Flow Rate: | 19.9 ft/s |
| Nominal Flowing K Factor: | 1.16 pulse/ft³ |
| Frequency at Maximum Process Flow Rate: | 25.5 Hz |
| Reynolds Number at Minimum Startup flow Rate: | 1815756.1 |
| Wetted Material: | Type 304 ss Tubing with Type 304 ss Flanges |
| Flange: | ANSI Class 150 |
| Model Code: | 83F-*12S1SS*** |

Figure 20A

FLOWMETER SPECIFICATION AND ORDERING SYSTEM

RELATED APPLICATION

This application claims the benefit of U.S. Provisional Application Ser. No. 60/540,233 filed Jan. 29, 2004, entitled FlowExpertPro.Com.

FIELD OF THE INVENTION

This invention relates to flowmeters, and more particularly, to a computer system in a client/server environment for receiving customer supplied flow parameters and generating choices of properly sized and configured flowmeters to select from to order.

BACKGROUND

Mass flowmeters, such as Coriolis- and Vortex-type flowmeters measure the mass flow rate of materials flowing through a conduit. Exemplary Coriolis and Vortex flowmeters include the I/A Series Coriolis and the 83 Series Vortex flowmeters available from The Foxboro Company of Foxboro, Massachusetts. Coriolis flowmeters, for example, have one or more conduits of straight or curved configuration. Each conduit configuration has a set of natural vibration modes. Each conduit is driven to oscillate at resonance in one of these natural modes. Material flows into the flowmeter from a connected pipeline on the inlet side of the flowmeter, is directed through the conduit or conduits, and exits the flowmeter through the outlet side thereof. The material flowing through the pipeline may be gas, liquid, solid, and any combination of these three. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset. As material begins to flow, Coriolis forces cause each point along the conduit to have a different phase. The phase on the inlet side of the conduit lags the driver, while the phase on the outlet side of the conduit leads the driver. Sensors on the conduit(s) produce sinusoidal signals representative of the motion of the conduit(s). Signals output from the sensors are processed to determine the phase difference between the sensors. The phase difference between two sensor signals is proportional to the mass flow rate of material through the conduit(s).

In order to determine the flowmeter model of the proper size and parameters for a pipeline, flow stream parameters for the pipeline must be known. Flow stream parameters include material flow rate, material density, material viscosity, material temperature, and material operating pressure. From these flow stream parameters, parameters for a flowmeter to insert into the pipeline can be determined. Flowmeter parameters include meter accuracy, pressure loss, and material velocity. The flowmeter parameters and flow stream parameters are used to determine the models of flowmeters that can be used to measure mass flow rate in the pipeline.

It is common to use software programs executed by a computer to determine the proper model. However, this generally requires that meter selection and sizing occur on premises where the computer executing the software resides. A drawback of these systems is that users may attempt to select and size a meter using outdated software and/or flowmeter data. Other proposed systems have attempted to address this shortcoming by enabling a user to log onto a computer to remotely access sizing software and order a desired flowmeter without the intervention of a human operator. However, these proposed systems tend to be relatively limited, relying on a user to supply a relatively large number of flow stream parameters in order to produce a flowmeter recommendation. These systems also tend to be limited to single flowmeter types, are not easily scalable to include additional flowmeter types, and generally do not attempt to determine the compatibility of particular process fluids with materials from which the flowmeters may be fabricated.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 3–22 are exemplary screen displays generated by various embodiments of the present invention.

SUMMARY

Figure 1:
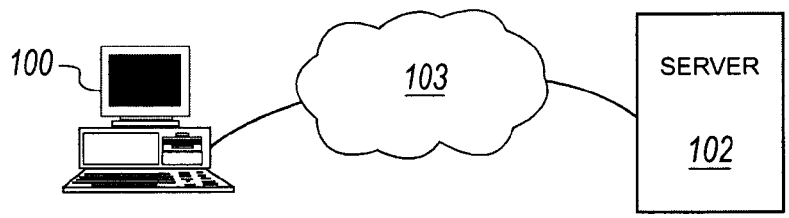
FIG. 1 is a schematic view of a client-server environment in which embodiments of the present invention may be practiced.

One aspect of the present invention includes a modular system for enabling remote configuring and ordering of flowmeters in a client-server environment. The system includes a server having a meter selection module configured to enable a user to select from a plurality of flowmeter types. The server also includes a process data module configured to receive process data from a client. A fluid selection module coupled to the process module is configured to receive a process fluid selection and to calculate properties thereof. A sizing module generates parameters of at least one sized flowmeter, sized in accordance with the received process data. A material selection module provides a list of materials from which the sized flowmeter may be fabricated, and a fluid rating module rates compatibility of the various materials with the process fluid selection. A results module is configured to generate data corresponding to expected performance of the sized flowmeter.

Another aspect of the invention includes the foregoing aspect, along with a choke calculation module is configured to determine whether a choking condition pertains to the sized flowmeter. In addition, this aspect includes a flow units selection page configured to enable a user to select desired fluid flow units appropriate for a particular application, a documentation module configured to generate documentation for the sized flowmeter, and the results module is configured to generate a graphical plot of the expected results.

Yet another aspect of the invention includes a method for providing remote ordering and configuring of flowmeters in a client-server environment. The method includes the use of a server to transmit to a client computer over a network, user selectable menu means listing a plurality of flowmeter types, and receiving a user request from the client to configure a flowmeter of at least one of the flowmeter types. The method also includes receiving process data from the client, receiving a process fluid selection from the client, sizing a flowmeter in accordance with the received process data and transmitting information on the sized flowmeter to the client. The method further includes generating a list of materials from which portions of the sized flowmeter may be fabricated, generating compatibility ratings for the materials with respect to the selected fluid, generating performance data corresponding to expected performance of the sized flowmeter, and transmitting the performance data to the client for display to a user.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

The above and other problems are solved and an advance in the art is made by a remote sizing and ordering system for flowmeters in accordance with this invention. Embodiments of the present invention allow a user to log in via a conventional network (e.g., Internet) connection. The user may then size, select and order a flowmeter appropriate for a particular application.

In accordance with this invention, a server computer stores and executes software that provides the remote sizing and ordering system of this invention. The server connects to a client computer operated by a user. The server then receives process flow data/parameters from a user, which are used by the server to properly size a selected flowmeter type.

The server may generate a display including at least one model sized for the selected process flow parameters. The display is transmitted to the client where it is displayed to the user. The user may then select one of the sized flowmeters and transmit the selection to the server.

The process flow data receivable by the server and usable for flowmeter sizing include, for example, operating flow rate, temperature, pressure, density, and viscosity, of the process fluid. The server calculates flowmeter parameters such as pressure drop and fluid velocity. Moreover, embodiments of the invention may calculate one or more of the foregoing input flow stream parameters, such as material viscosity or density, in the event they are not known or are otherwise omitted by the user.

After the user has configured a flowmeter, the flowmeter configuration may be stored in an electronic shopping cart. The customer then places an order for a flowmeter from configured flowmeters in the shopping cart. The server may then generate a message and transmits the order for production and for shipping the selected flowmeter(s) to the customer.

Embodiments of the present invention will now be discussed in greater detail with reference to the various figures. For convenience, the system will be described herein as embodied within a client/server environment in which the client is disposed remotely from the server. However, the skilled artisan should recognize that the system components described as resident within the server, may be disposed locally or remotely to one another, without departing from the spirit and scope of the present invention.

A typical internet connection which may be used to embody the invention is shown in FIG. 1. In this representative embodiment, remote client computer system 100 is resident at a customer site. Client 100 uses a modem or other networking device to connect to server 102, such as via the Internet 103 in a conventional manner. Client 100 may comprise substantially any device having a user input means and a processor, being capable of communicably connecting via a network such as the Internet, to server 102.

As used in this document, the term "computer" is meant to encompass a workstation, person computer, personal digital assistant (PDA), wireless telephone, or any other suitable computing device. Client 100 and server 102 may be coupled to each other using one or more local area networks (LANs), metropolitan area networks (MANs), wide area networks (WANs), the Internet, or any other appropriate wireline, wireless, or other links. The components of server 102 may operate on one or more computers at one or more locations, and may share one or more computers or other resources with one or more clients 100, according to particular needs. Information, such as included in the various pages described herein, may be passed between client 100 and server 102 in any suitable format, such as in the form of Hypertext Markup Language (HTML) or Extended Markup Language (XML) files.

Figure 2A:
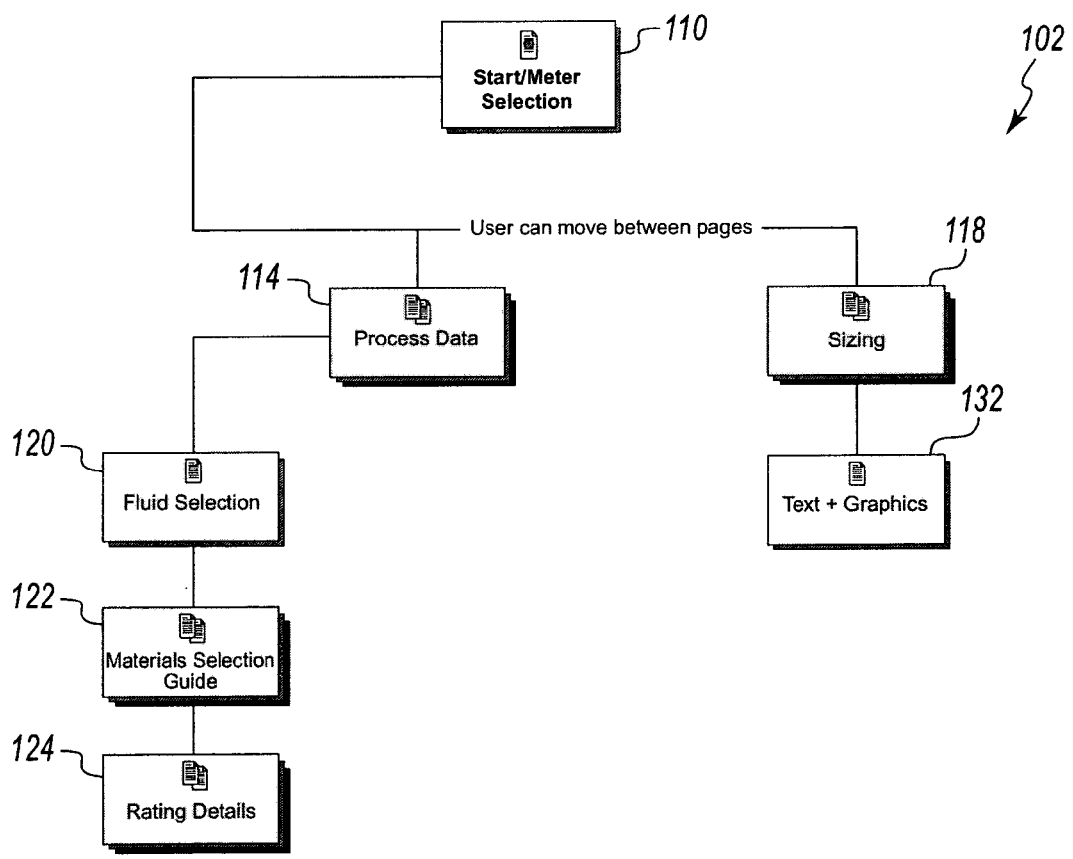
FIG. 2A is a block diagram of various components of an embodiment of a server system of the present invention

Turning now to FIG. 2A, an embodiment of the present invention includes a server 102, having various modules configured to effect functions associated with the sizing and selecting of various flowmeters. For example, this embodiment includes a meter selection module 110 coupled to a process data module 114 and a sizing module 118. In particular embodiments, a user may move between these modules without loss of data or other information during use of the system 102.

Figure 2B:
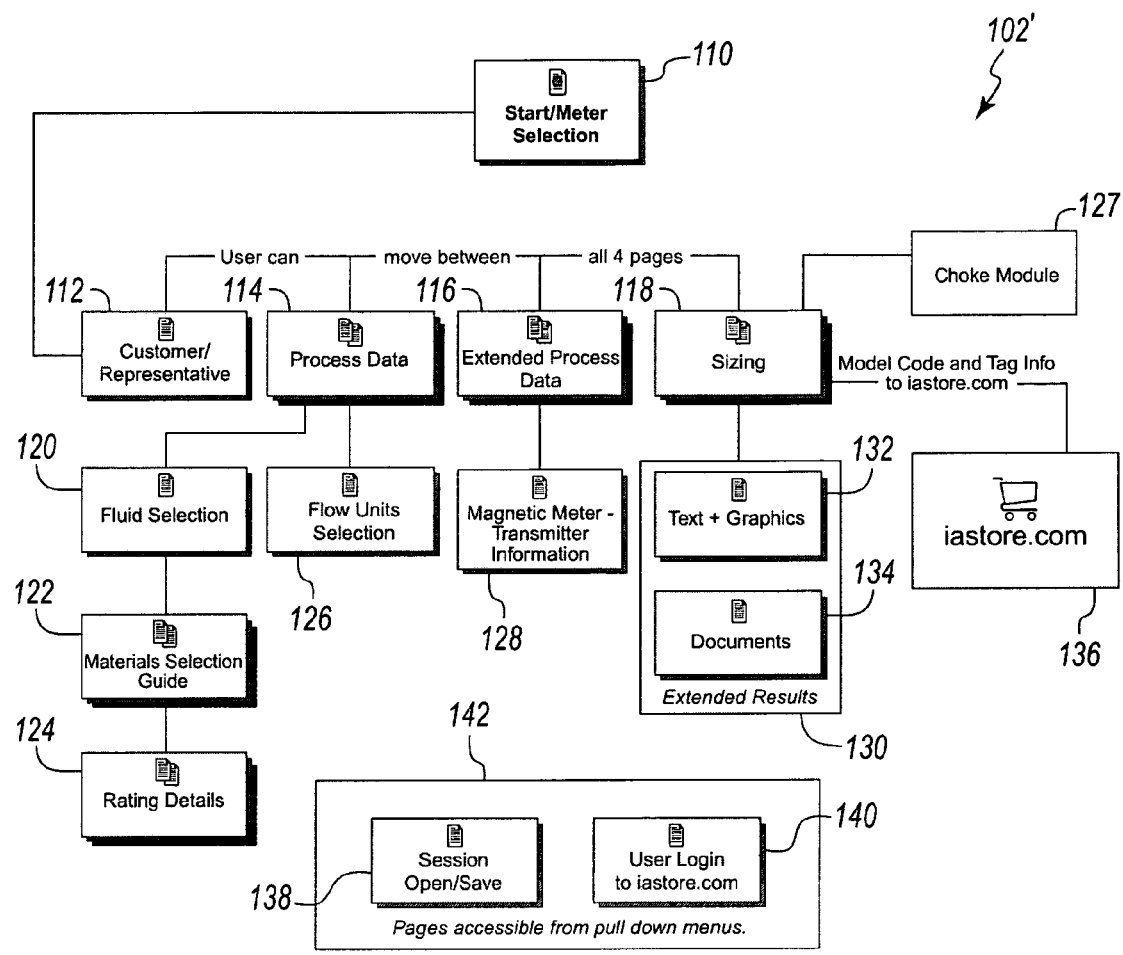
FIG. 2B is a block diagram of various components of an alternate embodiment of a server system of the present invention.

Process data module 114 is coupled to a fluid selection module 120, a materials selection module 122, and an optional rating details module 124. Turning now to FIG. 2B, a choke calculation module 127 is configured to determine whether a choking condition may be present for a particular flowmeter that may otherwise be suitable based on the process data/parameters of a particular application.

A results module 130, such as may be coupled to sizing module 118 in the embodiment shown, may optionally include a text and graphics module 132 which may be actuated to generate expected performance data for a selected flowmeter.

Continuing with to FIG. 2B, an alternate embodiment of the present invention includes a server 102', having various modules configured to effect functions associated with the sizing, selecting and ordering of various flowmeters. For example, this embodiment includes a meter selection module 110 coupled to a customer/representative information module 112, a process data module 114, an optional extended data module 116, and a sizing module 118. In particular embodiments, a user may move between these modules without loss of data or other information during use of the system 102.

Process data module 114 is coupled to a fluid selection module 120, a materials selection module 122, an optional rating details module 124, and a flow units module 126. A choke calculation module 127 is configured to determine whether a choking condition may be present for a particular flowmeter that may otherwise be suitable based on the input flow stream parameters of a particular application.

Extended process data module 116 is coupled to a transmitter information module 128, which may be particularly useful with respect to magnetic meters, as will be discussed hereinbelow. A results module 130, such as may be coupled to sizing module 118 in the embodiment shown, includes a text and graphics module 132 and a documentation module 134. A store module 136 may be actuated to generate an order for a selected flowmeter.

The modular construction of systems 102, 102', may be provided by the use of conventional object oriented programming techniques, such as are well known to those skilled in the art. Advantageously, this modularity enables embodiments of the instant invention to be easily scaled to facilitate the sizing and configuration of multiple flowmeter types as shown. In this regard, a new flowmeter type may be added to system 102, 102', simply by adding or amending one or more individual modules.

Moreover, the centralized nature of these server-based embodiments also effectively ensures that users have the most current information available when selecting and sizing a meter. These systems also help ensure that materials from which the flowmeters are fabricated are compatible with the user's particular process fluid. Referring now to FIG. 3, meter selection module 110 presents a user with an initial start/meter selection page 150. The user may then select a meter type by clicking on an image or a link below the image of the particular desired meter type. In the embodiment shown, selectable meter types include Coriolis, IFOA (Integral Flow Orifice Assembly), Compact Orifice, Magnetic, and Vortex. Alternate embodiments may include a larger or smaller selection of meter types. Examples of additional flowmeters that may be sized and/or purchased in accordance with the present invention include: turbine flowmeters; PD (Positive Displacement) flowmeters; thermal mass meters; primary head class devices such as orifice plates, nozzles, venturis, and averaging pitots; mass/multi-variable flowmeters such as multivariable vortex flowmeters; and mass/multivariable secondary devices such as multivariable pressure devices.

Once the meter type has been selected, customer/representative module 112 may generate a customer/representative page 152, such as shown in FIG. 4. As shown, this page provides fields into which a user may enter various customer and/or representative contact and billing information. Moreover, in the embodiment shown, page 152 includes tabs that may be selected to activate process data, extended data, and sizing modules 114, 116 and 118, respectively. Clicking these tabs brings the user to other pages (discussed herein-below) in which data may be entered before displaying the sizing result. The user may switch between these pages without losing entered data/information.

Although the top of page 152 as shown indicates that the user has selected Vortex meters, this page is otherwise substantially identical for regardless of which meter type is selected on page 150.

Turning now to FIG. 5, process data module 114 generates process data page 154 for Vortex meters. This page provides fields into which the user may enter process data associated with the user's particular application. A substantially similar page is generated for Coriolis meters. The page generated for Magnetic flowmeters is similar, though including an additional field for Conductivity. The page generated for IFOA meters is also similar to that shown, while including an additional field denoted Sizing Units. In particular embodiments, a user may select/change the units associated with a particular parameter. In the event the user changes the units after entering data, the values of the various fields may be converted to reflect the new units selection. Examples of the various fields that may be included in page 154 are shown in the following Table I.

TABLE I

Fluid Type selection varies by meter type as described below.

Coriolis: "Gas", "Liquid" or "Natural Gas"
Magnetic: "General Liquid", "Mildly Abrasive Slurry", "Severely Abrasive Slurry", or "Coating Liquid"
IFOA and Vortex: "Gas", "Liquid", "Natural Gas", "Saturated Steam" or "Superheated Steam"
Fluid is the fluid type selection screen.
Fluid Name is displayed when the fluid selection is "Other".
Flow Rate (Minimum Startup, Normal, Maximum)
Flow Rate Units is selected by pressing the "Units" button next to the flow rate units field. Flow units will be discussed in greater detail below.
Temperature (Minimum Startup, Normal, Maximum) The range is 0.0 to 800.0° F. with one decimal place displayed.
Temperature Units choices are "° C." or "° F.".
Pressure (Minimum Startup, Normal, Maximum) The range is 0.0 to 21000.0 with one decimal place displayed.
Pressure Units Valid choices are "atm", "bar", "bar g", "ftH20 (39.2° F.)", "inHg (32° F.)", "inHg (60° F.)", "kPa", "kPa g", "kg/cm$^2$", "kg/cm$^2$ g", "psia", or "psig".
Density range is 0.000 to 1610.000 with three decimal places displayed.
Density Units Valid choices are "kg/m$^3$", "lb/ft$^3$", or "lb/U.S. gal".
Viscosity range is 0.0 to 250,000.0 with three decimal places displayed.
Viscosity Units choices are "centipoise" or "centistoke".
Base Density range is 0.000 to 1610.000 with three decimal places displayed. It is displayed when the user is using standard units. The units displayed next to this value are the same as the density units.
Conductivity value must be greater than or equal to 0.5 with one decimal place displayed. The units are always "uS/cm".
Sizing Units choices are "inH20 (68° F.)", "kPa", "mbar", or "mmH20 (68° F.)".
Tag Number/Name may be optionally used to identify inputted data for subsequent recall.

Exemplary Extended Process Data pages for Vortex, Coriolis, Magnetic, and IFOA meters are respectively shown 155, 156, 158 and 160 in FIGS. 6–9A. As shown, these pages are unique for each different meter type. When the user changes units, the values of the corresponding fields may be converted to reflect the new units selection. Exemplary parameters associated with fields for each of the flowmeter types are shown in Tables II–IV below.

TABLE II

Vortex Meter - Extended Process Data

Meter Body Type choices are "Flanged", "Sanitary", or "Wafer".
Sensor Fill Fluid and Material choices are "Fluorolube Fill, Hastelloy", "Fluorolube Fill, Stainless Steel", "Silicone Fill, Hastelloy", "Silicone Fill, Stainless Steel", "Unfilled, Hastelloy", or "Unfilled Stainless Steel". This field is only shown when the "Meter Body Type" is not "Sanitary." Fluorolube types are not valid if steam is the selected "Fluid Type".
Line Size range is 0.00 to 2540.00 with two decimal places displayed.
Line Size Units choices are "inches" or "mm".
Mating Pipe Material choices are "Carbon Steel", "Cast Iron", "PVC", or "Stainless Steel".
Sensor Type will display either "Extended Range" or "Standard Range" based upon the maximum temperature. If the maximum temperature is −40 to 400° F. it is "standard range." If the maximum temperature is 400 to 800° F. it is "extended range." This is for informational purposes only.

TABLE II-continued

Vortex Meter - Extended Process Data

Dual Electronics and Isolation Valve choices are "(S) Single, No Isolation Valve", "(D) Dual, No Isolation Valve", "(K) Single with Isolation Valve", or "(L) Dual with Isolation Valve". This field is only shown when the "Meter Body Type" is not "Sanitary." When "Wafer" is the "Meter Body Type" the only selections available are 'K' and 'S'.
Output choices are "Analog", "Frequency", "Pulse", or "Other".
Scaling range is 0.0 to 10.0 with one decimal place displayed. It is only displayed when "Output" is set to "pulse."
Scaling Units is displayed when "Output" is set to "pulse."
URL 5000 Hz range is 0.0000 to 100000.0000 with four decimal places displayed. It is only displayed when "Output" is set to "frequency."
URL 5000 Hz Units is displayed when "Output" is set to "frequency."
20 mA range is 0.00 to 999,999.00 with two decimal places displayed. It is displayed when "Output" is set to "analog."
20 mA Units is only displayed when "Output" is set to "analog."
4 mA range is 0.00 to 999,999.00 with two decimal places displayed. It is displayed when "Output" is set to "analog."
4 mA Units is 'read-only' and set to the same value as the "20 mA Units." It is displayed when "Output" is set to "analog."

TABLE III

Coriolis Meter - Extended Process Data

Meter End Connection choices are "Standard" or "Sanitary".
Line Size range is 0.00 to 2540.00 with two decimal places displayed.
Line Size Units choices are "inches" or "mm".
Mating Pipe Material choices are "Carbon Steel", "Cast Iron", "PVC", or "Stainless Steel".
Flowtube Electrical Safety Certification choices are "CSA Class I, Division 1", "CSA Class I, Division 2", "FM Class I, Division 1", "FM Class I, Division 2", "SAA, Ex ib", "CENELEC, EEx ib", or "None".
Communications Protocol choices are "Local through keypad/display", "Foxboro HHT, PC10/20, I/A" or "Hart hand held communicator (M275)".
Number of Outputs choices are 0, 1, 2, or 3.
4–20 mA choices are 0, 1, 2, or 3.
Pulse choices can be 0, 1, 2, or 3. The available choices are based upon the 4–20 mA field's selected value. If it is 0 then 0–3 are valid. If it is 1 then 0–2 is valid. If it is 2 then 0–1 is valid. If it is 3 then 0 is the only valid option.
Output choices are "Analog", "Frequency", "Pulse", or "Other".
Scaling range is 0.0 to 10.0 with one decimal place displayed. It is displayed when "Output" is set to "pulse."
Scaling Units is displayed when "Output" is set to "pulse."
URL 10000 Hz range is 0.0000 to 100000.0000 with four decimal places displayed. It is displayed when "Output" is set to "frequency."
URL 10000 Hz Units is displayed when "Output" is set to "frequency."
20 mA range is 0.00 to 999,999.00 with two decimal places displayed. It is displayed when "Output" is set to "analog."
20 mA Units is displayed when "Output" is set to "analog."
4 mA range is 0.00 to 999,999.00 with two decimal places displayed. It is displayed when "Output" is set to "analog."
4 mA Units is 'read-only' and set to the same value as the "20 mA Units." It is displayed when "Output" is set to "analog."

TABLE IV

Magnetic Meter - Extended Process Data

Meter Body Type choices are "Flanged or Wafer", "Flanged", "Sanitary", or "Wafer".
Line Size range is 0.00 to 2540.00 with two decimal places displayed.
Line Size Units choices are "inches" or "mm".
Mating Pipe Material choices are "Carbon Steel", "Cast Iron", "PVC", or "Stainless Steel".
Liner Material choices are "Ceramic", "Ebonite", "EPDM", "Linatex", "Neoprene", "pfa", "ptfe", or "Polyurethane".
Electronics Mounting choices are "integral" or "remote".
Transmitter choices are "E96", "IMT 25", "IMT 25L", "IMT 96", "Model 47", or "Model 48".
Transmitter Information button displays a (e.g., separate pop-up)

TABLE IV-continued

Magnetic Meter - Extended Process Data window with magnetic meter transmitter information (discussed hereinbelow).
Electrode choices are "316 SS", "316L SS", "Conical 316SS", "Conical Hastelloy C", "Hastelloy C", "Platinum", "Platinum-Iridium", "Tantalum", "Tantalum-Tungsten", or "Titanium".
Cable Length range is 0.00 to 1000.00 with two decimal places displayed.
Cable Length Units choices are "ft" or "m".
Output choices are "Analog", "Frequency", "Pulse", or "Other".
Scaling range is 0.0 to 10.0 with one decimal place displayed. It is displayed when "Output" is set to "pulse."
Scaling Units is displayed when "Output" is set to "pulse."
URL 5000 Hz range is 0.0000 to 100000.0000 with four decimal places displayed. It is displayed when "Output" is set to "frequency."
URL 5000 Hz Units is displayed when "Output" is set to "frequency."
20 mA range is 0.00 to 999,999.00 with two decimal places displayed. It is displayed when "Output" is set to "analog."
20 mA Units is displayed when "Output" is set to "analog."
4 mA range is 0.00 to 999,999.00 with two decimal places displayed. It is displayed when "Output" is set to "analog."
4 mA Units is 'read-only' and set to the same value as the "20 mA Units." It is displayed when "Output" is set to "analog."

TABLE V

IFOA Meter - Extended Process Data

Figure 8:

Line Size choices are "0.5", "1.0", "1.5" or for metric units "15.0", "25.0", "40.0"
Line Size Units choices are "inches" or "mm".
Mating Pipe Material choices are "Carbon Steel", "Cast Iron", "PVC", or "Stainless Steel".
Orifice Plate Material choices are "Hastelloy C", "Monel", or "316 ss"
Orifice Plate Bore enables various choices to be selected As shown in FIG. 9B, magnetic transmitter module 128 (FIG. 2) may be activated by pressing the "Transmitter Information" button 159 on the magnetic meter extended process data page 158 (FIG. 8). Module 128 then generates a Magnetic Meter Transmitter page 162, e.g., in a pop-up window. In particular embodiments, page 162 is a read-only information page displaying conventional parameters associated with one or more transmitters suitable for use with particular magnetic flowmeters.

Exemplary sizing pages, generated by sizing module 118 (FIG. 2), are shown at 164, 166 and 168 of FIGS. 10–12, respectively. As shown, these pages display sized meter results based on the aforementioned user-supplied process information. These pages may also enable the user to enter any remaining information based on the particular flowmeter ultimately selected. In particular embodiments, the user initially selects a meter size of interest by selecting the Meter Size box 170. The values selectable by the user in box 170 are generated from the process data input and extended process data input by the user, and by the available sizes for the given meter type. Once the meter size is selected, remaining read-only fields in the page are updated to reflect the results. The user may then make other choices, such as Flange and Wetted/Body Material, from an array of choices (e.g., via pull-down menus at 172 and 174, respectively) determined by system 102 to be valid for that size. Sizing page 164 contains fields/values specific to Vortex meters, while page 168 is specific to IFOA flowmeters. Page 166 may be used for either Coriolis and Magnetic flowmeters.

When calculating values for sizing pages 164, 166, 168, embodiments of sizing module 118 may activate choke module 127, which is configured to detect and warn the user of potential choking conditions that may occur in an otherwise properly sized meter. The skilled artisan will recognize that choking commonly occurs when the velocity of the process fluid passing through a Coriolis flowmeter approaches the speed of sound for the particular fluid.

Choke module 127 is configured to initiate a check for potential choking when various predetermined conditions are present. Examples of such conditions include the meter type being Coriolis, and the fluid type being a gas. When these conditions are present, module 127 adjusts the density value used in the original velocity calculation by sizing module 118.

In this regard, the density value is adjusted by the ratio of the pressure drop across the meter from the original calculation. The density value is thus reduced by the same percentage by which the pressure drops when passing through the meter. The velocity is then re-calculated using the adjusted density value to calculate a new velocity value. Additional iterations may also be completed if desired. Choke module 127 then compares the converged velocity value to values for the speed of sound for the particular fluid. If the velocity value is at or above a predetermined percentage of the speed of sound for the fluid, then a notification is presented on sizing page 166 (FIG. 11), e.g., adjacent the displayed velocity values, indicating that a choking condition is present. This notification may also be carried to other pages, such as results page 216 discussed hereinbelow with respect to FIG. 20B.

Optionally, in particular embodiments, a single estimated speed of sound value may be used instead of speed of sound values specifically associated with the particular fluid selected. Such an estimated value has been shown to provide a sufficiently accurate choking result for many sizing applications.

Units for the sizing pages will be brought forward from those selected on the process data page 154. Optionally, pages 164, 166 and 168 may be provided with links 176, which a user may actuate to display of additional information relating to the sized meters. In the embodiments shown, links 176 may be used to select modules 132, 134 and 136 to display information in separate windows as discussed hereinbelow. Exemplary fields used in the sizing pages are included in Table VI.

TABLE VI

Select Meter Size values are generated from user-supplied process data, and by the available sizes for a given meter type.
Maximum Meter Capacity (URL). This field is named Maximum Upper Range Value for magnetic flow meters.
Minimum Meter Capacity (LFCI). This field is named Minimum Range Value for magnetic flow meters.
Extended Meter Capacity is only available with Coriolis flowmeters.
Flow Range is a ratio displayed for example as 0.0:1.
Pressure Drop at Maximum Process Flow Rate
Pressure Drop at Minimum Startup Process Flow Rate
Accuracy at Maximum Process Flow Rate
Accuracy at Minimum Startup Process Flow Rate
Velocity at Maximum Process Flow Rate
Velocity at Minimum Process Flow Rate
Nominal Flowing K Factor is for Vortex flowmeter.
Frequency at Maximum Process Flow Rate is used with the Vortex flowmeter.
Reynolds Number at Minimum Startup Flow Rate is used with the Vortex flowmeter.
Pipe Diameter is used with the IFOA flowmeter.
Reynolds Number at Maximum Flow Rate is used with the IFOA flowmeter.
Reynolds Number at Normal Flow Rate is used with the IFOA flowmeter.
Differential Pressure at Maximum Flow Rate is used with the IFOA flowmeter.

TABLE VI-continued

Differential Pressure at Normal Flow Rate is used with the IFOA flowmeter.
Discharge Coefficient C is used with the IFOA flowmeter.
Thermal Correction Factor is used with the IFOA flowmeter.
Beta is used with the IFOA flowmeter.
Unrecovered Head Loss is used with the IFOA flowmeter.
Wetted Material selections may vary based upon process data and meter size selection. This field is named Body Material for IFOA meters.
Flange selections may vary based upon process data and meter size selection. This selection is not available for Vortex flowmeters with a Wafer body type.
Model Code is generated based upon all the previous process data and sizing selections. This data may then be used to reference actual model code values in the appropriate product (e.g., PSS) documents. Model code may then be passed to module 136 (e.g., iastore.com) for pricing.

Turning now to FIG. 13, Fluid Selection module 120 (FIG. 2) generates a fluid selection page 178 when the user clicks the fluid select button 180 next to the fluid name on the process data page 154 (FIG. 5). This page 178 presents the user with a list 182 of fluids from which one may be chosen. In the event the user does not find a desired fluid on the list, "Other" may be selected from the list, or optionally, by simply selecting the "Other Fluid" button. If "Other" is the selected fluid, there will be no physical properties or materials selection available for the user, as discussed below.

Once a fluid from list 182 is selected, the user may select: "Back to Process Data with Selected Fluid and Values" 184 to use that fluid and return values to the process data page 154 (FIG. 5); "Back to Process Data" (which in particular embodiments may be "Cancel") 186 to return to the process data page, e.g., without using the selected fluid (e.g., to cancel any selected units); or if available for the given fluid, the user may select "Materials Selection Guide" 188 to display materials selection information for a particular fluid, as discussed hereinbelow.

Physical Properties section 190 of page 178 allows the user to enter temperature and pressure values for many process fluids, including for example, saturated steam, superheated steam and Natural Gas. The system then calculates various additional values, such as density, viscosity, molecular weight, compressibility, and ideal specific gravity. In addition, in the event the fluid is saturated steam, the system may calculate temperature and/or pressure. In particular embodiments, fluid selection module 120 performs these calculations using several conventional algorithms. For example, Natural Gas calculations may be generated using the AGA8 standard (American Gas Association). Values such as liquid density, liquid viscosity, and gas viscosity may be generated using the AIChE standards (American Institute of Chemical Engineers).

The units are also selectable by the user. As mentioned above, various values, such as temperature, pressure, density and viscosity, may be transferred from this page to process data page 154 (FIG. 5), e.g., upon selection of button 184. Exemplary fields used in this page are included in Table VII.

TABLE VII

Fluid Type is a read-only field that represents the fluid type selection from the process data page.
Temperature range is the same as on the process data screen.
Temperature Units choices are the same as the process data screen.
Pressure range the same as on the process data screen.
Pressure Units choices are the same as the process data screen.
Density/SG is a read-only field.

TABLE VII-continued

Density Units choices are the same as the process data screen.
Viscosity is a read-only field.
Viscosity Units choices are the same as the process data screen.
Molecular Weight is a read-only field.
Compressibility is a read-only field.
Ideal Specific Gravity is a read-only field.
Base Temperature range is the same as on the process data screen.
Base Pressure range is the same as on the process data screen.
Base Density is a read-only field.

As mentioned above, a user may actuate materials selection module 122 (FIG. 2) by clicking on button 188. Module 122 may then generate materials selection guide pages for various meter types, in accordance with the particular fluid selected. In particular embodiments, the title of each page includes the fluid name that has been selected.

For example, referring now to FIGS. 14–16, material selection pages 192, 194 and 196 respectively display material choices for various components of Vortex, Coriolis, and Magnetic meters, with reference to a particular fluid. As shown, the material selection guide pages 192, 194 and 196 are generally unique for each individual meter type. Meter tabs at the top of the page may permit the user to toggle between the materials selection guide pages associated with each meter type. The system defaults to the page associated with the meter type previously selected by the user.

Pages 192, 194, 196 also include rating designations 200 which provide an indication of the suitability of the displayed materials for use with the selected fluid. Explanations of rating designations 200 are generated when a user selects "Ratings Details" button 202.

Referring now to FIGS. 17 and 18, selection of button 202 activates ratings module 124 (FIG. 2) to generate one or more ratings Details page, such as shown at 204 and 206, respectively. Pages 204 and 206 display detailed read-only information on what each rating may mean. Page 204 is specific to Coriolis meters, while page 206 corresponds to Magnetic and Vortex meters.

Turning to FIG. 19, a flow unit selection page 208 is generated by module 126 (FIG. 2) when the user clicks on "Units" button 210 on process data page 154 (FIG. 5). The user may select a rate unit from the upper section of the page and a time unit from the lower section of the page. Once satisfied with the selection, the user may then press "Back to Process Data with Selected Units" button 212 to return to the process data page with the newly configured units choice, or "Back to Process Data" 214 to cancel the changes.

Figure 20B:
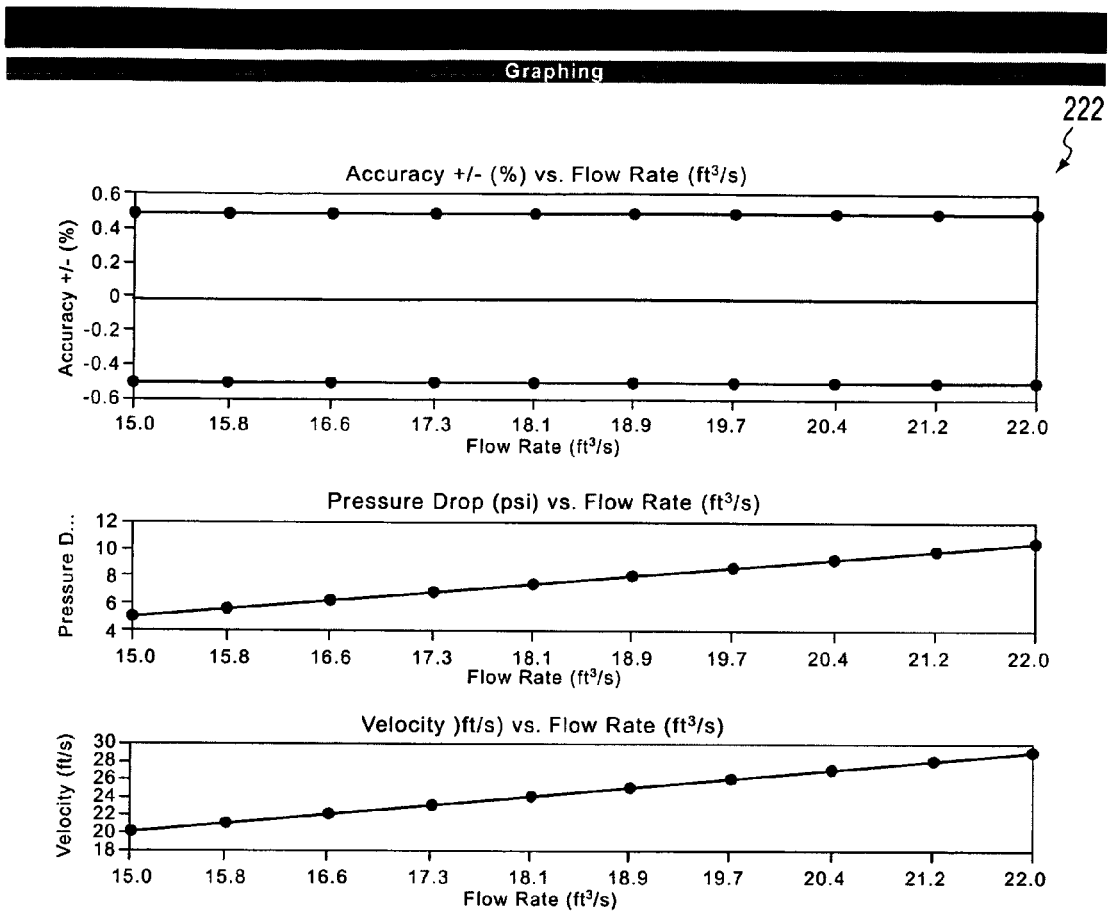

Turning now to FIGS. 20A and 20B, a results pages 215 and 216 are generated by module 132 (FIG. 2) when the user clicks on "Results" 218 on one of the meter sizing pages 164, 166, 168, etc., such as shown in FIGS. 10–12. As shown, results page 215 provides a summary of the various information entered by the user and/or generated by the system. Results page 216 provides a summary of expected results generated by the selected flowmeter, optionally in the form of both a Table 220 and graphs 222. In the particular embodiment shown, graphs 222 display "Accuracy (%) vs. Flow Rate", "Pressure Drop vs. Flow Rate", and/or "Velocity vs. Flow Rate." Exemplary graphs contain several data points running from the startup flow rate to the maximum flow rate. Table 220 displays numerical values of each of the data points used to generate graphs 222. Pages 215 and 216 may be desirably displayed in separate pop-up windows rather than overwriting the sizing, or other, information.

In addition to module 132, results module 130 also includes document module 130 (FIG. 2), which is actuated when the user clicks on link 224 on meter sizing pages 164, 166, 168, etc., to display various documentation (e.g., in .pdf format) for the selected meter.

Figures 21, 22:
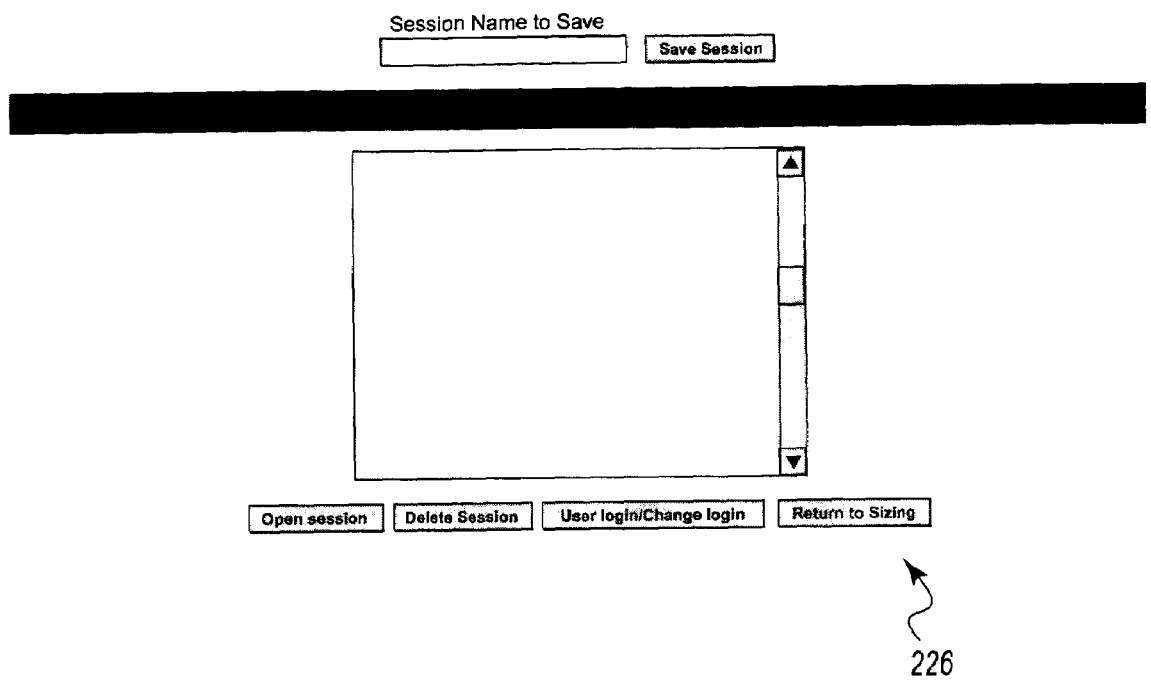

Turning now to FIGS. 21 and 22, many of the pages described hereinabove feature drop down menus, such as implemented by menu module 142, including session module 138 and user login module 140 (FIG. 2B). For example, a "Home" button may include a drop down menu providing various sites related to flowmeters, which a user may wish to visit. Selecting any of these items may jump the browser in a conventional manner to the corresponding site. Session page 226 provides the user with "Open Session" and "Save Session" choices, etc. Selecting these choices will allow the user to load or save session data for later use. Login page 228 enables a user to access store module 136 (FIG. 2B), such as www.iastore.com, provided and operated by Invensys Systems, Inc. (Foxboro, Mass.) to place an order for selected flowmeter(s).

Having described embodiments of the subject invention, exemplary aspects of operation of these embodiments will now be described with reference to Table VIII.

As shown, attention is now directed to the following is a description of the operation thereof. Referring to Table 18, server 102, 102' transmits 250 to client 100, user selectable menu means listing a plurality of flowmeter types, such as shown in FIG. 3. The server then receives 252 a user request from the client to configure a flowmeter of at least one of the flowmeter types. The server also receives 254, e.g., in response to transmission of page 154 (FIG. 5) process data from the client. A process fluid selection is also received 256 from the client, such as in response to page 178 (FIG. 13). A flowmeter is then sized 258 in accordance with the received process data. The server also completes 260 a choke analysis for the sized flowmeter, e.g., using choke module 127 (FIGS. 2A, 2B). The sized flowmeter may then be transmitted 262 to the client. This embodiment of the subject invention also generates 264 a list of materials from which portions of the sized flowmeter may be fabricated, and generates 266 compatibility ratings for the materials with respect to the selected fluid. Performance data is generated 268 corresponding to expected performance of the sized flowmeter; and transmitted 270 to the client for display to a user.

TABLE VIII

| | |
|---|---|
| 250 | Transmit user selectable menu means listing a plurality of flowmeter types |
| 252 | receive user selection of flowmeter types |
| 254 | receiving process data |
| 256 | receive process fluid selection |
| 258 | size a flowmeter |
| 260 | complete choke analysis |
| 262 | transmitting information on the sized flowmeter to client |
| 264 | generate list of material choices for flowmeter fabrication |
| 266 | generate compatibility ratings for the materials with respect to the selected fluid |
| 268 | generate performance data for sized flowmeter |
| 270 | transmit performance data to client |

Choke analysis 260 may be effected as shown in Table IX. As indicated, the choke analysis may include adjusting 280 a density value used to calculate fluid velocity by a ratio of pressure drop across the meter, and re-calculating 281 fluid velocity using the adjusted density value. Optionally, the adjusting step 280 may be iterated 282. The re-calculated fluid velocity may then be compared 284 to the speed of sound for the selected fluid. In the event the re-calculated fluid velocity is within a predetermined percentage of the speed of sound, then the server may indicate 286 that a choking condition is present.

TABLE IX

| | |
|---|---|
| 280 | adjust a density value used to calculate fluid velocity by a ratio of pressure drop across the meter as previously calculated, |
| 281 | Re-calculating fluid velocity using the adjusted density value |
| 282 | iterating 280 and 281 |
| 284 | comparing the velocity value to the speed of sound |
| 286 | indicating whether a choking condition is present |

Additional optional steps in operation of these embodiments will be evident to those skilled in the art in light of the aforementioned description and Figures.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A system for enabling remote configuring and ordering of flowmeters in a client-server environment, the system comprising:
  a server including:
    a meter selection module configured to enable a user to select from a plurality of flowmeter types;
    a process data module configured to receive process data from a client;
    a fluid selection module coupled to said process module;
    said fluid selection module configured to receive a process fluid selection and to calculate properties thereof;
    a sizing module configured to generate parameters of at least one sized flowmeter, sized in accordance with the received process data;
    a choke calculation module configured to determine whether a choking condition pertains to the sized flowmeter;
    a material selection module configured to provide a list of materials from which the sized flowmeter may be fabricated;
    a fluid rating module configured to rate compatibility of the materials with the process fluid;
    a flow units selection page configured to enable a user to select desired fluid flow units appropriate for a particular application;
    a results module configured to generate a graphical plot of expected performance of the sized flowmeter; and
    a documentation module configured to generate documentation for the sized flowmeter.

2. A modular system for enabling remote ordering and configuring of flowmeters in a client-server environment, the system comprising:
  a server including:
    a meter selection module configured to enable a user to select from a plurality of flowmeter types;
    a process data module configured to receive process data from a client;
    a fluid selection module configured to receive a process fluid selection;
    a sizing module configured to aenerate parameters of at least one sized flowmeter, sized in accordance with the received process data;
    a material selection module configured to provide a list of materials from which the sized flowmeter may be fabricated;
    a fluid rating module configured to rate compatibility of the materials with the process fluid;
    a results module configured to generate data corresponding to expected performance of the sized flowmeter; and
    a choke module configured to complete a choking analysis for the sized flowmeter.

3. The system of claim 2, wherein said fluid selection module is configured to generate properties thereof.

4. The system of claim 3, wherein said fluid selection module is configured to generate properties selected from the group consisting of density, viscosity, molecular weight, compressibility, ideal specific gravity, density slope, temperature, pressure, and base density.

5. The system of claim 2, comprising a flow units selection page configured to enable a user to select desired fluid flow units appropriate for a particular application.

6. The system of claim 2, comprising a documentation module configured to generate documentation for the sized flowmeter.

7. The system of claim 2, comprising a drop down menu page configured to generate drop down menus.

8. The system of claim 2, wherein said results module is configured to generate a graphical plot of the expected performance of the sized flowmeter.

9. The system of claim 2, comprising a store module configured to generate an order for the sized flowmeter for shipping to the user.

10. The system of claim 2, wherein said choke module is configured to initiate a check for potential choking when predetermined conditions are satisfied.

11. The system of claim 10, wherein the predetermined conditions include the sized flowmeter being of the Coriolis type and the fluid selection being a gas.

12. The system of claim 10, wherein said choke module is configured to adjust a density value used by said sizing module to calculate fluid velocity.

13. The system of claim 12, wherein said choke module is configured to adjust the density value by the ratio of the pressure drop across the meter as previously calculated, and to calculate fluid velocity using the adjusted density value.

14. The system of claim 13, wherein said choke module is configured to iterate the adjustment of the density value and the calculation of fluid velocity.

15. The system of claim 13, wherein said choke module is configured to compare the velocity value to the speed of sound for the selected fluid and to indicate whether a choking condition is present.

16. A modular system for enabling remote ordering and configuring of flowmeters in a client-server environment, the system comprising:
  a server including:
    a meter selection module configured to enable a user to select from a plurality of flowmeter types;
    a process data module configured to receive process data from a client;
    a fluid selection module configured to receive a process fluid selection;
    a sizing module configured to generate parameters of at least one sized flowmeter, sized in accordance with the received process data;

a material selection module configured to provide a list of materials from which the sized flowmeter may be fabricated;

a fluid rating module configured to rate compatibility of the materials with the process fluid;

a results module configured to generate data corresponding to expected performance of the sized flowmeter; and a magnetic meter transmitter module configured to determine applicability of a magnetic meter transmitter in response to said extended process data.

17. A method for providing remote ordering and configuring of flowmeters in a client-server environment, the method comprising:

in a server;
(a) transmitting to a client computer over a network, user selectable menu means listing a plurality of flowmeter types, the client being located remotely from said server;
(b) receiving a user request from the client to configure a flowmeter of at least one of the flowmeter types;
(c) receiving process data from the client;
(d) receiving a process fluid selection from the client;
(e) sizing a flowm.eter in accordance with the received process data;
(f) transmitting information on the sized flowmeter to the client;
(g) generating a list of materials from which portions of the sized flowmeter may be fabricated;
(h) generating compatibility ratings for the materials with respect to the selected fluid;
(i) generating performance data corresponding to expected performance of the sized flowmeter;
(i) transmitting the performance data to the client for display to a user; and
(k) completing a choke analysis for the sized flowmeter.

18. The method of claim 17, comprising determining properties of the process fluid.

19. The method of claim 17, wherein said generating (i) comprises generating at least one graphical plot corresponding to the expected performance.

20. The method of claim 17, comprising sizing a plurality of sized flowmeters.

21. The method of claim 17, comprising generating an order for the sized flowmeter for shipping to the user.

22. The method of claim 17 further comprising:
in said server,
(l) Transmitting configuration options to said computer over said network for display to said user; and
(m) receiving at least one of said configuration options selected by said user.

23. The method of claim 22 wherein said receiving at least one of said configuration options comprises receiving a process connection type for connection to a flowmeter.

24. The method of claim 17 wherein said step of receiving process data comprises:
receiving a fluid flow rate.

25. The method of claim 17 wherein said receiving process data comprises:
receiving a fluid density.

26. The method of claim 17 comprising calculating a fluid density.

27. The method of claim 17 wherein said receiving process data comprises receiving a fluid viscosity.

28. The method of claim 17, comprising calculating a fluid viscosity.

29. The method of claim 17 wherein said receiving process data comprises receiving a fluid temperature.

30. The method of claim 17 wherein said receiving process data comprises receiving an operating pressure.

31. The method of claim 17 further comprising transmitting a request for said process data over the network to the client for display to a user.

32. The method of claim 17 further comprising adding the sized flowmeter to an electronic shopping cart.

33. The method of claim 17 wherein said sizing a flowmeter comprises calculating pressure drop.

34. The method of claim 17 wherein said sizing a flowmeter comprises calculating fluid velocity.

35. The method of claim 17, wherein said completing a choke analysis comprises adjusting a density value used to calculate fluid velocity.

36. The method of claim 35, wherein said completing a choke analysis comprises adjusting the density value by a ratio of pressure drop across the meter as previously calculated, and calculating fluid velocity using the adjusted density value.

37. The method of claim 36, wherein said completing a choke analysis comprises iterating the adjustment of the density value and the calculation of fluid velocity.

38. The method of claim 36, wherein said completing a choke analysis comprises comparing the velocity value to the speed of sound for the selected fluid and indicating whether a choking condition is present.

39. A method for providing remote ordering and configuring of flowmeters in a client-server environment, the method comprising:

a server;
(a) transmitting to a client computer over a network, user selectable menu means listing a plurality of flowmeter types, the client being located remotely from said server;
(b) receiving a user request from the client to configure a flowmeter of at least one of the flowmeter types;
(c) receiving process data from the client;
(d) receiving a process fluid selection from the client;
(e) sizing a flowmeter in accordance with the received process data;
(f) transmitting information on the sized flowmeter to the client;
(g) generating a list of materials from which portions of the sized flowmeter may be fabricated;
(h) generating compatibility ratings for the materials with respect to the selected fluid;
(i) generating performance data corresponding to expected performance of the sized flowmeter;
(j) transmitting the performance data to the client for display to a user; and
wherein said selected flowmeter comprises a flowmeter selected from the group consisting of Coriolis, IFOA, Compact Orifice, Magnetic, Vortex, and combinations thereof.

40. An article of manufacture for enabling remote ordering and configuring of flowmeters in a client-server environment, said article of manufacture comprising:
a computer usable medium having a computer readable program code embodied therein, said computer usable medium having computer readable program code for:
transmitting to a client computer over a network, user selectable menu means listing a plurality of flowmeter types, the client being located remotely from said server;

receiving a user request from the client to configure a flowmeter of at least one of the flowmeter types;

receiving process data from the client;

receiving a process fluid selection from the client;

sizing a flowmeter in accordance with the received process data;

transmitting information on the sized flowmeter to the client;

generating a list of materials from which portions of the sized flowmeter may be fabricated;

generating compatibility ratings for the materials with respect to the selected fluid;

generating performance data corresponding to expected performance of the sized flowmeter;

transmitting the performance data to the client for display to a user; and completing a choke analysis for the sized flowmeter.

* * * * *